United States Patent
Inoue

(10) Patent No.: US 10,358,550 B2
(45) Date of Patent: *Jul. 23, 2019

(54) ETHYLENE-VINYL ALCOHOL COPOLYMER COMPOSITION, MULTILAYERED SHEET AND SECONDARY MOLDED ARTICLE THEREOF USING SAME

(71) Applicant: THE NIPPON SYNTHETIC CHEMICAL INDUSTRY CO., LTD., Osaka (JP)

(72) Inventor: Kota Inoue, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 552 days.

This patent is subject to a terminal disclaimer.

(21) Appl. No.: 15/054,605

(22) Filed: Feb. 26, 2016

(65) Prior Publication Data

US 2016/0177080 A1    Jun. 23, 2016

Related U.S. Application Data

(63) Continuation of application No. PCT/JP2014/074071, filed on Sep. 11, 2014.

(30) Foreign Application Priority Data

Sep. 20, 2013 (JP) .................. 2013-195436

(51) Int. Cl.

| | |
|---|---|
| B32B 27/30 | (2006.01) |
| B32B 27/32 | (2006.01) |
| C08L 29/04 | (2006.01) |
| C08L 23/08 | (2006.01) |
| C08L 29/06 | (2006.01) |
| B29B 13/02 | (2006.01) |
| B29C 51/10 | (2006.01) |
| B29C 51/14 | (2006.01) |
| B29C 51/42 | (2006.01) |
| B32B 1/02 | (2006.01) |
| B32B 5/02 | (2006.01) |
| B32B 7/12 | (2006.01) |
| B32B 15/08 | (2006.01) |
| B32B 25/08 | (2006.01) |
| B32B 27/08 | (2006.01) |
| B32B 27/10 | (2006.01) |
| B32B 27/12 | (2006.01) |
| C08K 5/098 | (2006.01) |
| B29K 23/00 | (2006.01) |
| B29K 105/00 | (2006.01) |

(Continued)

(52) U.S. Cl.
CPC ............ *C08L 29/06* (2013.01); *B29B 13/02* (2013.01); *B29C 51/10* (2013.01); *B29C 51/14* (2013.01); *B29C 51/421* (2013.01); *B32B 1/02* (2013.01); *B32B 5/022* (2013.01); *B32B 5/024* (2013.01); *B32B 7/12* (2013.01); *B32B 15/08* (2013.01); *B32B 25/08* (2013.01); *B32B 27/08* (2013.01); *B32B 27/10* (2013.01); *B32B 27/12* (2013.01); *B32B 27/306* (2013.01); *B32B 27/32* (2013.01); *C08K 5/098* (2013.01); *C08L 23/0861* (2013.01); *C08L 29/04* (2013.01); *B29K 2023/086* (2013.01); *B29K 2023/12* (2013.01); *B29K 2105/256* (2013.01); *B29L 2009/00* (2013.01); *B29L 2031/712* (2013.01); *B32B 2250/02* (2013.01); *B32B 2250/246* (2013.01); *B32B 2255/10* (2013.01); *B32B 2255/20* (2013.01); *B32B 2255/205* (2013.01); *B32B 2262/062* (2013.01); *B32B 2264/102* (2013.01); *B32B 2270/00* (2013.01); *B32B 2307/514* (2013.01); *B32B 2307/516* (2013.01); *B32B 2307/7242* (2013.01); *B32B 2439/00* (2013.01); *B32B 2439/70* (2013.01); *C08K 2201/008* (2013.01); *C08L 2205/025* (2013.01)

(58) Field of Classification Search
CPC . C08L 29/04; C08L 23/0861; C08L 2205/025
See application file for complete search history.

(56) References Cited

U.S. PATENT DOCUMENTS

| | | |
|---|---|---|
| 5,344,715 A | 9/1994 | Negi et al. |
| 6,503,588 B1 | 1/2003 | Hayashi et al. |
| | (Continued) | |

FOREIGN PATENT DOCUMENTS

| | | |
|---|---|---|
| JP | S63-230757 A | 9/1988 |
| JP | H08-239528 A | 9/1996 |
| | (Continued) | |

OTHER PUBLICATIONS

European Search Report issued with respect to application No. 14845502.5, dated Apr. 3, 2017.

(Continued)

*Primary Examiner* — Jeffrey C Mullis
(74) *Attorney, Agent, or Firm* — Greenblum & Bernstein, P.L.C.

(57) ABSTRACT

Disclosed is an EVOH resin composition comprising 2 types of EVOH resins having a different ethylene content and saponification degree from each other. The EVOH resin composition can reduce the occurrence of streaks with retaining gas-barrier property even when applying to vacuum-pressure forming. The use of the resin composition also make it possible to provide a method for producing a container such as cup having excellent gas-barrier property and appearance by vacuum-pressure forming and the like.

10 Claims, No Drawings

(51) Int. Cl.
*B29L 9/00* (2006.01)
*B29L 31/00* (2006.01)

(56) References Cited

U.S. PATENT DOCUMENTS

| | | | |
|---|---|---|---|
| 2002/0055572 A1* | 5/2002 | Tai | B32B 27/08 |
| | | | 524/413 |
| 2011/0091734 A1* | 4/2011 | Kazeto | C08J 3/226 |
| | | | 428/520 |

FOREIGN PATENT DOCUMENTS

| | | | |
|---|---|---|---|
| JP | H08-311276 A | 11/1996 |
| JP | 2000-265025 A | 9/2000 |
| JP | 2002-60496 A | 2/2002 |
| JP | 2003-54592 A | 2/2003 |
| JP | 2009-56708 A | 3/2009 |
| JP | 2012-153815 A | 8/2012 |
| JP | 2012-153861 A | 8/2012 |

OTHER PUBLICATIONS

International Search Report issued with respect to application No. PCT/JP2014/074071, dated Dec. 2, 2014.
International Preliminary Report on Patentability issued with respect to application No. PCT/JP2014/074071, dated Mar. 22, 2016.

* cited by examiner

ETHYLENE-VINYL ALCOHOL COPOLYMER COMPOSITION, MULTILAYERED SHEET AND SECONDARY MOLDED ARTICLE THEREOF USING SAME

CLAIM FOR PRIORITY

This application is a Continuation of PCT/JP2014/074071 filed Sep. 11, 2014, and claims the priority benefit of Japanese application 2013-195436 filed Sep. 20, 2013, the contents of which is expressly incorporated by reference herein in its entirety.

TECHNICAL FIELD

The present invention relates to a resin composition mainly comprising ethylene-vinyl alcohol copolymer (hereinafter, referred to as "EVOH resin"), in particular, relates to an EVOH resin composition comprising 2 types of EVOH resins having a different ethylene content from each other. The EVOH resin composition capable of providing a molded article having an excellent appearance without streak and other defects even in the case that a multilayered structure including a layer of the resin composition is formed to a secondary molded article such as container.

BACKGROUND ART

EVOH resin is transparent and excellent in gas-barrier property, odor retention, solvent resistance, and oil resistance. Therefore EVOH resin is formed to film, sheet or a container such as bottle and cup, which is used as a packaging for food, pharmaceutical, industrial medicine, agricultural chemicals, and so on. EVOH resin can be solely applied to packaging such as sheet, film and container, however, EVOH resin is commonly laminated with a layer of a thermoplastic resin other than EVOH resin through an adhesive resin layer to form to a multilayered sheet or film for ensuring water resistance, improved strength, and other functional properties.

Since EVOH resin is less stretched than other thermoplastic resin, EVOH resin is required to improve stretchability in order to follow up the other thermoplastic resin in hot-drawing for forming to an article such as film, sheet, and container.

In general, the higher content of ethylene unit an EVOH resin has, the higher stretchability the EVOH resin tends to exhibit. On the other hand, the higher content of ethylene unit an EVOH resin has, the lower content of vinyl alcohol structural unit the EVOH resin has, the lower the gas-barrier property is. Hereinafter, the content of ethylene unit and the content of vinyl alcohol structural unit are simply called "ethylene content" and "vinyl alcohol content" respectively. In order to obtain both excellent gas-barrier property and stretchability, use of an EVOH resin having high vinyl alcohol content (i.e. low ethylene content and high saponification degree) together with an EVOH resin having low vinyl alcohol content (i.e. high ethylene content and low saponification degree) was suggested.

For example, JP S63-230757A (patent document 1) suggests a resin composition comprising two EVOH resins having a different ethylene content and saponification degree from each other. The patent document 1 discloses a resin composition employing two EVOH resins so that difference of ethylene content between the EVOH resins is 4 mol % or more, difference of saponification degree between them is 3 mol % or more, and difference of solubility degree parameter between them exceeds a predetermined value. Also, the patent document 1 discloses a multilayered sheet or film including the resin composition as an intermediate layer between polystyrene layers. The multilayered sheet or film may be molded by vacuum-pressure forming to produce a transparent molded article excellent in gas-barrier property and appearance without non-uniformity thickness nor fracture.

JP H8-311276A (patent document 2) discloses an EVOH resin composition comprising two EVOH resins each having an ethylene content different by from 3 to 20 mol %, and boron in a specific concentration. The patent document 2 discloses that a multilayered sheet or film including a layer of the EVOH resin composition as an intermediate layer between polypropylene layers through an adhesive resin layer did not allow to become whitening or uneven stretched causing streak formation when the multilayered sheet or film was heated and drawn with 4 times in the machine direction and 6 times in the transverse direction.

PRIOR ART

Patent Document

[Patent document 1] JP S63-230757A
[Patent document 2] JP H8-311276A

SUMMARY OF THE INVENTION

Technical Problem to be Solved by the Invention

EVOH resin compositions suggested in the patent documents 1 and 2 are aimed to improve moldability of EVOH resin with maintaining gas-barrier property. A typical forming to a container from a multilayered sheet or film is performed by heating and softening the multilayered sheet or film, and then forcing the multilayered sheet or film against a mold by vacuuming or blowing compressed air. Such a molding with use of suction or compressed air seems more severe forming process than a uniaxial or biaxial stretching for the multilayered sheet or film. We have noticed that streak occurred when the multilayered sheet or film disclosed in the patent document 2 was formed to a cup by vacuum-pressure forming, although no streak was occurred when it was merely drawn.

In the patent document 1, the multilayered sheet or film was formed into a container by vacuum-pressure forming at a draw ratio of 1 (corresponding to 7 times in stretching magnification) or stretching blow molding with 10 times in stretching magnification. Thus molded article was evaluated merely with eyes with respect to its appearance, transparency, occurrence of fracture, and uniformity, but not evaluated with respect to the occurrence of streak.

The object of the present invention is to provide a resin composition comprising two types of EVOH resins having a different ethylene content and saponification degree from each other, the resin composition being capable of alleviating streak with maintaining gas-barrier property even when applied to vacuum-pressure forming. Also the object is to provide a method for producing a container such as cup with excellent gas-barrier property and appearance from the resin composition by vacuum forming or air-pressure forming.

Means for Solving the Problems

The present inventor has studied about the occurrence of streak in the multilayered sheet or film including EVOH resin layer laminated over a thermoplastic resin layer in vacuum-pressure forming.

When different types of resins are coextruded, molted resin flows to be layered are joined at a confluent part corresponding to surface boundary, where turbulence easily happens due to different fluidity of the molten resins. The resin composition comprising EVOH resins having a different ethylene content from each other provides a mixed flow of molten resins having different melt viscosity from each other. In the case that an resin composition comprising EVOH resins having a significant difference in ethylene content and saponification degree corresponding to vinyl alcohol content is coextruded with adhesive resin and another thermoplastic resin to form a multilayered sheet or film in which the resin composition is intermediate layer between the adhesive resin layer and the thermoplastic resin layer, not only turbulent flow naturally caused by joining resin melts to be different layers but also minute turbulence caused by mixing the adjacent layer (particularly adhesive resin layer) with two EVOH resin flows. As a result, more complicated turbulent flow seems to occur at the interface between the resin composition layer and the adjacent layers thereof. By the way, vacuum or air-pressure forming for producing a container differs from a stretching operation. A tension applied on the multilayered sheet or film varies depending on position in the vacuum or air-pressure forming, while all over sheet or film is evenly stretched in the stretching operation. If a multilayered sheet or film involving a complicated turbulence is applied to vacuum or air-pressure forming, the minute turbulence is extended and would appear as a streak in a resulting molded article.

Under these situations, the present inventor has further studied the resin composition comprising EVOH resins having a significantly different ethylene content and saponification degree relating to vinyl alcohol content from each other, and reviewed the relation between the differences of ethylene content and saponification degree, and the occurrence of streak. Also the inventors reviewed to improve fluidity of molten resin. Thus the invention has been achieved.

An EVOH resin composition of the present invention comprises (A) two types of ethylene-vinyl alcohol copolymers and (B) a zinc salt of higher fatty acid, wherein difference of content of ethylene unit (ΔEt) between the ethylene-vinyl alcohol copolymers is from 10 to 25 mol %.

The present invention involves a multilayered sheet or film comprising at least one layer of the resin composition of the invention. In the multilayered sheet or film, a layer of a thermoplastic resin other than ethylene-vinyl alcohol copolymer is laminated over at least one face of the resin composition layer through an adhesive resin layer.

According to another aspect of the invention, a method is provided for producing a container with excellent gas-barrier property and appearance using a multilayered sheet or film including at least one layer of the resin composition of the invention. The inventive method for producing a container comprises heating and softening a multilayered sheet or film of the invention; forcing the multilayered sheet or film against a mold by suction of air and/or compressed air; cooling and releasing the mold to obtain a container excellent in gas-barrier property and appearance.

According to a different aspect of the invention, a method is provided for reducing streak occurred in a secondary molded article from a multilayered sheet or film including at least one layer of a resin composition comprising two types of ethylene-vinyl alcohol copolymers having a different ethylene content from each other as a gas-barrier layer and zinc salt of higher fatty acid. The difference of ethylene content (ΔEt) between the two types of ethylene-vinyl alcohol copolymers is from 10 to 25 mol %.

Effect of the Invention

The EVOH resin composition of the invention can be layered as an intermediate layer in a multilayered sheet or film, which can be formed to a container excellent in appearance without streak even by vacuum-pressure forming.

MODES FOR CARRYING OUT THE INVENTION

The present invention will be described in detail below. The following is merely description for a typical embodiment and does not restrict the invention.
<EVOH Resin Composition>
The EVOH resin composition of the invention comprises two types of ethylene-vinyl alcohol copolymers (i.e. EVOH resins) and zinc salt of higher fatty acid, wherein difference of content of ethylene unit between the EVOH resins, i.e. ΔEt, is from 10 to 25 mol %.
[EVOH Resin]
Two EVOH resins used in the invention will be described.

EVOH resin is a resin produced typically by copolymerizing ethylene and vinyl ester-based monomer and saponifying the resulting copolymer (ethylene-vinyl ester copolymer). EVOH resin is water-insoluble thermoplastic resin. For the vinyl ester-based monomer, vinyl acetate is commonly used from the viewpoint of economics. A known copolymerization method, for example, solution polymerization, suspension polymerization, or emulsion polymerization may be employed. Solution polymerization with use of methanol as a solvent is typically employed. The resulting ethylene-vinyl ester copolymer is saponified by a known method.

Thus obtained EVOH resin contains ethylene unit and vinyl alcohol unit as main structural units, and may contain a bit of vinyl ester unit as a remaining unsaponified unit.

The common EVOH resin has an ethylene content of usually 20 to 60 mol %. In general, the higher ethylene content provides more excellent moldability, but lower gas-barrier property. If the ethylene content is less than 20 mol % (in other words, vinyl alcohol content of 80 mol % or more), the melting point is close to the decomposition temperature and therefore applying to melt-molding tends to become difficult.

Besides ethylene unit, vinyl alcohol structural unit, and vinyl ester structural unit remaining unsaponified, the EVOH resin used in the invention may further contain a structural unit derived from the following comonomers: α-olefins such as propylene, isobutene, α-octene, α-dodecene, and α-octadecene; hydroxy group-containing α-olefins such as 3-buten-1-ol, 4-penten-1-ol, 3-buten-1,2-diol and ester thereof, acyl thereof and the like derivative of hydroxy group-containing α-olefin; unsaturated carboxylic acid and salt thereof, partially or complete alkyl ester, nitrile, amide and anhydride thereof; unsaturated sulfonic acid and salt thereof; vinylsilane compound; vinyl chloride; styrene and so on.

In addition, a post-modified EVOH-based resin such as urethanated, acetalized, cyanoethylated or oxyalkylenated EVOH-based rein may be used.

Among these modified EVOH resins, an EVOH resin containing primary hydroxyl group at a side chain thereof through copolymerization is preferred because it is improved in secondary moldability of forming such as stretching operation and vacuum or air-pressure forming. An EVOH resin containing 1,2-diol unit at a side chain thereof is particularly preferred.

Two types of EVOH resins used in the invention are selected from aforementioned EVOH resins for a combination of EVOH resins where the difference of ethylene content ($\Delta$Et) is from 10 to 25 mol %, preferably from 10 to 23 mol %, particularly preferably from 10 to 20 mol %. If the difference of ethylene content is unduly small, retaining the balance between moldability and gas-barrier property tends to be difficult. If the difference is unduly large, the compatibility of the EVOH resins is lowered, and a streak might occur due to the difference of their stretchability when the resin composition is secondary molded, and to make the matter worse, a transparent molded article might not be produced.

Specifically, a combination of an EVOH resin having relatively low ethylene content (low ethylene EVOH resin) and an EVOH resin having relatively high ethylene content (high ethylene EVOH resin) is preferably employed.

The low ethylene EVOH resin is an EVOH resin having an ethylene content of 20 to 40 mol %, preferably 22 to 38 mol %, particularly preferably 25 to 33 mol %. Unduly low ethylene content provides EVOH resin whose decomposition temperature gets close to its melting point, which would give a resin composition having a difficulty in melt-molding. EVOH resin having unduly high ethylene content would not provide a resin composition with sufficient gas-barrier property.

A saponification degree of vinyl ester component of the low ethylene EVOH resin is usually 90 mol % or more, preferably from 95 to 99.99 mol %, particularly preferably 98 to 99.99 mol %. Unduly low saponification degree tends to give insufficient gas-barrier property.

In addition, a melt flow rate (MFR) at 210° C. under load of 2,160 g of the low EVOH resin is from usually 1 to 100 g/10 min., preferably 3 to 50 g/10 min., particularly preferably 3 to 10 g/10 min. Unduly high MFR might result in a molded article having a lowered mechanical strength. Unduly low MFR might lower extrusion processability of the resin composition.

The ethylene content of the high ethylene EVOH resin is from usually 40 to 60 mol %, preferably 42 to 56 mol %, more preferably 44 to 53 mol %. If the ethylene content is unduly low for the high ethylene EVOH resin, a sufficient effect of improving stretchability by the high ethylene EVOH resin is not obtained, as a result, secondary formability tends to be lowered. On the contrary, if the ethylene content is unduly high, the low ethylene EVOH resin needs an increased ethylene content in order to adjust the difference of ethylene content to a desired range, as a result, the resin composition layer would be deteriorated in gas-barrier property.

The saponification degree of the vinyl ester component of the high ethylene EVOH resin is usually 90 mol % or more, preferably from 93 to 99.99 mol %, particularly preferably from 98 to 99.99 mol %. Unduly low saponification degree might lower gas-barrier property of the high ethylene EVOH resin.

The melt flow rate (MFR) at 210° C. under load of 2,160 g of the high ethylene EVOH resin is from usually 1 to 100 g/10 min., preferably 3 to 50 g/10 min., particularly preferably 3 to 30 g/10 min. Unduly high MFR might result in a molded article having a lowered mechanical strength. Unduly low MFR might lower extrusion processability of the resin composition.

The low ethylene EVOH resin is combined with a high ethylene EVOH resin so that flowabilities of these EVOH resins would be similar to each other when melt-molding. Preferably, the combination is arranged so that the difference of MFR (210° C., load of 2160 g), i.e. $\Delta$MFR, is 5 g/10 min. or less. More preferably, the saponification degrees of the EVOH resins are adjusted so that the difference of MFR (210° C., load of 2160 g), i.e. $\Delta$MFR, is 1 g/10 min. or less.

The ethylene content is determined by measuring and calculating the content of vinyl alcohol unit according to, for example, ISO14663.

The saponification degree of vinyl ester portion is determined by preparing an EVOH resin solution (solvent: water/methanol) and measuring the saponification degree of the EVOH resin solution according to, for example, JIS K6726.

The weight ratio of the low ethylene EVOH resin (A1) to the high ethylene EVOH resin (A2), i.e. A1/A2, is from usually 90/10 to 60/40, preferably 85/15 to 65/35, particularly preferably 80/20 to 70/30. If the rate of the low ethylene EVOH resin (A1) is too low, the resin composition layer would have insufficient gas-barrier property. If the rate of the low ethylene EVOH resin (A1) is too high, the sufficient effect of improving stretchability by the high ethylene EVOH resin would not be obtained.

[(B) Zinc Salt of Higher Fatty Acid]

For the zinc salt of higher fatty acid, a fatty acid of carbon number of 8 or more (preferably 12 to 30, more preferably 12 to 20) is employed for the invention. Examples of the higher fatty acid include lauric acid, tridecyl acid, myristic acid, pentadecyl acid, palmitic acid, heptadecyl acid, stearic acid, nonadecane acid, oleic acid, capric acid, behenic acid, linoleic acid and so on. Of these, stearic acid, oleic acid, and lauric acid are preferably employed.

Such a zinc salt of higher fatty acid can improve secondary formability of the resin composition comprising two types of EVOH resins having a difference of ethylene content ($\Delta$Et) of 10 to 25 mol %. In particular, even if the resin composition is applied to vacuum-pressure forming in which a tension loaded varies with position or tensions are loaded from all directions in diameter increasing process, a molded article with less streak would be obtained.

The mechanism has not been clarified, however, we suppose that the zinc salt of higher fatty acid would improve compatibility of the molten two EVOH resins each having a different ethylene content, and thereby reducing a minute turbulence at the surface boundary of the two EVOH resins occurred when the resin composition is coextruded with other resin. Such a reducing effect is not obtained by employing other metal salt of the higher fatty acid or a zinc salt of lower fatty acid. Therefore, it is surprised that a zinc salt of higher fatty acid is effective for reducing turbulence.

The amount of the zinc salt of higher fatty acid (B) is from usually 50 to 800 ppm, preferably 100 to 700 ppm, particularly preferably 250 to 600 ppm, based on the total amount of two types of EVOH resins. Unduly small amount of the zinc salt of higher fatty acid lowers the effect of reducing streak caused from the secondary molding, and to make the matter worse, transparency of the resulting molded article would be deteriorated. On the other hand, a metal salt of higher fatty acid often acts as a catalyst of decomposing a molten EVOH resin. Unduly large amount of the zinc salt of higher fatty acid causes to decompose EVOH resins to generate gases, which might make an adverse effect on the production of a multilayered sheet or film by melt-molding or coextruding.

[Other Additives]

Besides the aforementioned components, the resin composition of the invention may contain a known additive such as, plasticizer, filler, anti-blocking agent, antioxidant, colorant, antistatic agent, ultraviolet absorber, or lubricant in the amount of the range without adversely affecting, for example, 1 wt % or less.

<Method for Preparing EVOH Resin Composition>

A method for preparing a resin composition of the invention is not particularly limited. The resin composition may be prepared by blending two types of EVOH resins and zinc salt of higher fatty acid in a predetermined ratio and then melt-kneading, or by dry-blending these components in a predetermined ratio. The preparation method by dry-blending is preferred because of effective production. The dry-blending permits a variety of combination of EVOH resins according to needs and an optional addition of a zinc salt of higher fatty acid. Also, a preparation by dry-blending is preferred because decomposition of molten EVOH resins by zinc salt of higher fatty acid may be suppressed. According to the invention, the preparation by dry-blending can attain a condition where zinc salt of higher fatty acid is present at the surface of each EVOH resin pellet.

The preparation by dry-blending may be conducted by, for example, blending zinc salt of higher fatty acid after dry-blending lower ethylene EVOH resin and higher ethylene EVOH resin; blending zinc salt of higher fatty acid with a compound of a mixture of two EVOH resins prepared beforehand. Alternatively, two types of EVOH resins and zinc salt of higher fatty acid may be dry-blended together to prepare a resin composition.

Alternatively, one EVOH resin is dry-blended with zinc salt of higher fatty acid and subsequently the obtained mixture is dry blended with the other EVOH resin. Alternatively, one EVOH resin and zinc salt of higher fatty acid is compounded beforehand, and then the obtained compound is blended with the other EVOH resin.

Furthermore, the preparation by dry-blending may be conducted by mixing a pre-dryblend of one EVOH resin and zinc salt of higher fatty acid with a pre-dryblend of the other EVOH resin and zinc salt of higher fatty acid. It is possible to prepare a compound of one EVOH resin and zinc salt of higher fatty acid, and a compound of the other EVOH resin and zinc salt of higher fatty acid respectively, and then blend these compounds.

<Application of Resin Composition>

The resin composition of the invention may be formed into, for example, film, sheet, cup or bottle by melt-molding. For the melt-molding method, extrusion molding such as T-die extrusion, tubular (blown) film extrusion, blow molding, melt spinning and contour extrusion, and injection molding may be employed. The melt-molding temperature may be often selected from the common range of 150 to 300° C.

A molded article formed from the resin composition of the invention alone may be utilized for various applications. The resin composition may be laminated on a substrate to improve strength and give another functions. Also the resin composition may be laminated on other thermoplastic resin layer to form a multilayered sheet or film. Thus produced multilayered sheet or film is preferably used because the resin composition can reduce turbulence at a surface boundary caused from coextrusion.

As an additional application, the resin composition of the invention may be utilized for reducing streak occurred in a secondary molded article from a multilayered sheet or film including at least one gas-barrier layer made of the resin composition comprising two types of EVOH resins having a different ethylene content from each other.

Another aspect of the invention involves a method for preventing the occurrence of streak from a secondary molded article. The method relates to a secondary molded article including at least one gas-barrier layer made of the resin composition comprising two types of EVOH resins having an ethylene content different from each other, and zinc salt of higher fatty acid. The difference in the ethylene content between the two EVOH resins, $\Delta Et$, is from 10 to 25 mol %.

The zinc salt of higher fatty acid may be blended with the two EVOH resins preferably by dry-blending.

<Multilayered Sheet or Film>

A multilayered sheet or film of the invention comprises at least one layer of the EVOH resin composition of the invention. A preferable multilayered sheet or film has a constitution in which a layer of thermoplastic resin other than EVOH resin is laminated over at least one face of the layer of the resin composition of the invention through an adhesive resin layer.

The other thermoplastic resin used in the invention, which is called "substrate resin", includes, for example, polyethylenes such as linear low density polyethylene, low density polyethylene, very low density polyethylene, medium density polyethylene, and high density polyethylene; polyolefins such as polypropylene, ethylene-propylene block- or random-copolymer, copolymer of propylene and α-olefin having 4 to 20 carbon atoms, polybutene, and polypentene; graft-modified polyolefins obtained by graft modifying the aforementioned polyolefins with unsaturated carboxylic acid or its ester; ethylene-vinyl compound copolymer such as ionomer, ethylene-vinyl acetate copolymer, ethylene-acrylic acid copolymer, and ethylene-acrylate copolymer; polyester-based resin; polyamide-based resin including copolyamide; halogenated polyolefin such as polyvinyl chloride, polyvinylidene chloride, chlorinated polyethylene, and chlorinated polypropylene; vinyl ester-based resin; elastomer such as polyester elastomer and polyurethane elastomer; acryl-based resin; polystyrene; aromatic or aliphatic polyketone, polyalcohols obtained by reducing these polymers, and so on. Polyolefin-based resin and polyamide-based resin, especially polyethylene and polypropylene are preferred from the viewpoint of a practical utility including physical property such as strength of a resulting multilayered sheet or film.

A conventional antioxidant, antistatic agent, lubricant, nucleating agent, anti-blocking agent, ultraviolet absorber, or wax may be contained in the aforementioned substrate resin.

A multilayered sheet or film comprising EVOH resin composition layer and substrate resin layer is produced by a known lamination process. Examples of the lamination processes include extruding a substrate resin melt on the film or sheet of EVOH resin composition; extruding EVOH resin composition melt on film or sheet of substrate resin; coextruding EVOH resin composition and substrate resin; a process of assembling EVOH resin composition layer and substrate resin layer using a known adhesive such as organic titanium compound, isocyanate compound, polyester-based compound, or polyurethane compound; coating a solution of EVOH resin composition on a film or sheet of substrate resin, and then removing the solvent of the solution. Of these processes, coextrusion is preferably employed from the viewpoint of cost and environment.

The constitution of the multilayered sheet or film may be arbitrarily employed. Not only double layers structure of a/b but also a various structures such as b/a/b, a/b/a, a1/a2/b, a/b1/b2, b2/b1/a/b1/b2, b2/b1/a/b1/a/b1/b2 and other structure may be employed, wherein the layer of EVOH resin composition is denoted by "a" (for example, a1, a2, . . . ) and the layer of substrate resin is denoted by "b" (for example b1, b2, . . . ). A recycled material, which is obtained by re-melt molding waste edges and scraps generated in the production of a multilayer structure, comprises EVOH resin composition and a substrate resin, and therefore may be utilized to form a multilayered sheet or film such as b/R/a, b/R/a/b, b/R/a/R/b, b/a/R/a/b, b/R/a/R/a/R/b, wherein "R" denotes a layer of the recycled material.

In the multilayer sheet or film mentioned above, an adhesive resin layer may be interposed between the layers, if necessary. A conventional adhesive may be used for the adhesive resin layer. An appropriate adhesive resin is selected depending on the type of the substrate resin. Typically, carboxyl group-modified olefin-based polymer, which is obtained by allowing to chemically bond unsaturated carboxylic acid or anhydride thereof to polyolefin-based resin through addition reaction or grafting reaction, may be employed. In particular, maleic anhydride-modified polyolefin may be preferably used for the adhesive resin. The maleic anhydride-modified polyolefin is preferably combined with a substrate of polyolefin, especially polypropylene.

Examples of the maleic anhydride-modified polyolefin include maleic anhydride-graft modified polyethylene, maleic anhydride-graft modified polypropylene, maleic anhydride-graft modified ethylene-propylene block- or random-copolymer, maleic anhydride-graft modified ethylene-ethylacrylate copolymer, maleic anhydride-graft modified ethylene-vinyl acetate copolymer, and the like. These examples may be preferably used alone or a combination of two or more of them.

Each adhesive resin may be blended with an EVOH resin other than EVOH resin contained in the resin composition, EVOH resin composition of the invention, polyisobutylene, rubber/elastomer component such as ethylene-propylene rubber, as well as a resin of the b layer. In particular, blending a polyolefin-based resin other than that used for adhesive resin is useful because of improving adhesiveness.

The thicknesses of the substrate resin layer and adhesive resin layer in the multilayered sheet or film are not limited, and determined depending on layer constitution, type of substrate resin and adhesive resin, application, packaging form, intended physical properties, and so on. The thickness of the substrate resin layer is selected from the range of usually 0.1 to 5000 µm, preferably 1 to 1000 µm, and the thickness of the adhesive resin layer is selected from the range of about 0.1 to 500 µm, preferably about 1 to 250 µm.

The thickness of the EVOH resin composition layer is varied with gas-barrier property to be attained, and is selected from the range of usually 0.1 to 500 µm, preferably 0.1 to 250 µm particularly preferably 0.1 to 100 µm. If the thickness is unduly thin, the multilayered sheet or film could not attain an intended gas-barrier property. On the contrary, if the thickness is unduly thick, the multilayered sheet or film might become deficient flexibility.

The thickness ratio of the resin composition layer to the substrate resin layer in a multilayered sheet or film, i.e. resin composition layer/substrate resin layer, is usually from 1/99 to 50/50, preferably from 5/95 to 45/55, particularly preferably from 10/90 to 40/60. If a multilayer structure includes plural of resin composition layers or substrate resin layers, the thickness ratio is determined in terms of the most thick resin composition layer to the most thick substrate resin layer. The thickness ratio of the resin composition layer and the adhesive resin layer, i.e. resin composition layer/adhesive resin layer, is usually from 10/90 to 99/1, preferably from 20/80 to 95/5, particularly preferably from 30/70 to 90/10. If a multilayer structure includes plural resin composition layers or adhesive resin layers, the thickness ratio is determined in terms of the ratio of the most thick resin composition layer to the most thick adhesive resin layer.

The multilayered sheet or film having aforementioned structure is usually subjected to hot-drawing for a variety of applications. A various known hot drawing processes may be conducted on the multilayered sheet or film of the invention. This is because the EVOH resin composition layer as a gas-barrier layer could exhibit excellent gas barrier property and turbulence at the surface boundary might be reduced.

Specific examples of the hot drawing processes include: uniaxial or biaxial stretching where a multilayered sheet or film is stretched in the width direction with holding both sides thereof; draw forming process where a multilayered sheet or film is heated and softened to form into a container by pressing and the like; vacuum forming, air-pressure forming, or vacuum-pressure forming where a multilayered sheet or film is heated up to a pliable forming temperature and forced against a mold by vacuuming or blowing pressurized air; forming by tubular stretching or stretch blow molding a preformed multilayer sheet such as parison; and other processes. Since the multilayered sheet or film employing a layer of the EVOH resin composition of the invention reduces turbulence caused at a surface boundary of the EVOH resin composition layer, and the multilayered sheet or film can exhibit an excellent stretchability in hot-drawing. This makes possible for the multilayered sheet to apply to uniaxial or biaxial stretching, where the sheet is uniaxially stretched and stretched again in a different direction, as well as draw-forming, where the multilayered sheet is stretched radially by forcing against a mold, and blow molding.

Such a hot-drawing is carried out at a temperature selected from the range of usually 40 to 300° C., preferably 50 to 160° C., in terms of the temperature measured near the surrounding multilayered sheet or film. The stretching magnification is usually from 2 to 50 times, preferably from 2 to 10 times in terms of area ratio.

The multilayered sheet or film is heated preferably in hot air oven, heater type oven or the combination thereof, which can heat the multilayered sheet or film evenly. An appropriate heating process is selected depending on types of thermoforming including stretching process.

A multilayered sheet or film obtained by coextrusion and hot-drawing may be laminated by extrusion coating on another substrate, or adhering another film or sheet as a substrate. For the substrate, not only thermoplastic resin aforementioned as a substrate resin but also poorly stretchable substrate including paper, metal foil, woven fabric, non-woven fabric, metal cotton, wooden material and the like material may be used. In addition, inorganic layer made of metal or metal oxide may be formed on the multilayer sheet or film by vaporization.

Thus obtained film, sheet, or stretched film is formed into bag, cup, tray, tube, bottle or other container as a molded article, which is useful for various packaging, container or cover for general food as well as a condiment such as mayonnaise and dressing, fermented food such as miso, oil and fat food such as salad oil, beverages, cosmetics, and pharmaceutical.

[Production of Secondary Molded Article by Vacuum Forming or Air-Pressure Forming]

The multilayered sheet or film of the invention is appropriately applied to the production of a secondary molded article, especially a container such as cup and tray, by vacuum forming or air-pressure forming. The multilayered sheet or film employs a layer of the resin composition of the invention which containing a mixture of two EVOH resins, however, minute turbulence of resin flows at surface boundary of the resin composition layer is supposed to be reduced. Accordingly, the multilayered sheet could provide a secondary molded article having excellent appearance.

According to the invention, the method for producing a container with superior gas-barrier property and appearance comprises heating and softening a multilayered sheet or film of the invention nearby a mold; forcing the sheet or film against the mold by a suction of air and/or compressed air; cooling and releasing the mold to obtain a container.

The container is shaped into a bottle having a circular bottom, bottle having a rectangular bottom, deformed container having a bottom, container having a frustum bottom with gradually increased or decreased in diameter from the opening to the bottom thereof, polyhedral container whose bottom having smaller area than the opening, hemispheric container, container with downsized bottom at 2-steps in diameter and other shaped container, but not limited thereto. The container may have flange or a convex section.

In the case of the production of a molded article such as cup and tray having 0.1 to 3 of draw ratio which is a ratio of depth (unit:mm) to maximum diameter (unit:mm) of the molded article, vacuum-pressure forming is commonly employed. The vacuum-pressure forming has difficulty in providing a molded article with an excellent appearance. This is because the vacuum forming includes severe stretching and tension applied to resin melt corresponding to side portion of the cup differs from the tension applied to resin melt corresponding to bottom portion during the stretching. However, a molded article having an excellent appearance without impairing inherent gas-barrier property can be produced by using a multilayered sheet or film including a layer of the resin composition of the invention, even if the multilayered sheet or film is formed into cup-shaped container by vacuum-pressure forming which gives a different tension with portions.

The heating temperature in the heating and softening process is selected from the range of usually 40 to 300° C., preferably 50 to 170° C., particularly preferably 60 to 160° C., in terms of the temperature in the atmosphere surrounding multilayered sheet or film. If the heating temperature is unduly low, the multilayered sheet or film is insufficiently softened and would not be formed to an article with an excellent appearance. If the heating temperature is unduly high, the balance of viscosities of molten layers is lost and would not be formed to an article with an excellent appearance.

The heating time is a time necessary for arriving at a temperature such that the multilayer sheet or film become sufficiently pliable to be molded. Such a heating time is appropriately determined depending on layer structure of the multilayer sheet or film, compositions of the layer material of the multilayered sheet or film, heater temperature set for heating the multilayered sheet or film, and so on.

The draw ratio in vacuum-pressure forming, i.e. depth of the molded article (unit: mm)/maximum diameter of the molded article (unit: mm), is selected from the range of usually 0.1 to 3, preferably 0.2 to 2.5, particularly preferably 0.3 to 2, depending on intended shapes of a container as a molded article. If the draw ratio is unduly large, fracture might occur in the EVOH resin composition layer. If the draw ratio is unduly small, uneven wall thickness might be provided with the resulting molded article.

The thicknesses of the thermoplastic resin layer and adhesive resin layer of the secondary molded article from the multilayer sheet are determined depending on layer constitution of the multilayered sheet or film, thermoplastic resin types, adhesive resin types, applications, packaging form, required physical properties and so on. The thickness of the thermoplastic resin layer is selected from the range of usually 0.1 to 3000 μm, preferably 1 to 500 μm, and the thickness of the adhesive resin layer is selected from the range of usually 0.1 to 300 μm, preferably 1 to 100 μm, but not limited thereto.

The thickness of the layer of the resin composition after aforementioned stretching process is selected from the range of usually 0.1 to 300 μm, preferably 0.1 to 100 μm, particularly preferably 0.1 to 50 μm, depending on intended gas-barrier property and so on. Unduly thin resin composition layer could not attain satisfied gas-barrier property, and unduly thick resin composition layer would provide a film with insufficient flexibility.

The thickness ratio of the EVOH resin composition layer to adhesive resin layer as well as the ratio of total thicknesses of the EVOH resin composition layers to the thermoplastic resin layers do not vary drastically before and after hot-drawing. Accordingly, these ratios are about the same as those of the multilayered sheet or film.

According to the method of the invention, a transparent container retaining intrinsic gas-barrier property without thickness non-uniformity. Also visible streak is reduced in a produced container. This effect seems to obtain from the multilayered sheet or film used as a material. The multilayered sheet or film includes an EVOH resin composition layer which has a reduced minute turbulence at the interface between the EVOH resin composition layer and adjacent layer thereof, the minute turbulence causing streaks. This results from that the miscibility of two EVOH resins contained in the resin composition is increased by adjustment of the difference of their fluidities. Thus the appearance of the molded article is superior, and therefore the molded article is useful for packaging or container for general food, condiment such as mayonnaise and dressing, fermented food such as miso, oil and fat food such as salad oil, beverages, cosmetics, pharmaceutical preparations, and the like.

EXAMPLE

Hereinafter the present invention is described below based on examples, but the invention is not restricted by the examples unless exceeding the gist of the invention.

Incidentally, the unit "part" in the examples is on the basis of weight unless otherwise indicated.

[Production of EVOH Resin Composition Nos. 1 to 10]

Two EVOH resins selected from EVOH resins 1, 2, 3, and 4 described below were used for an EVOH resin composition. The two EVOH resins selected as shown in Table 1 were dry-blended so that the amount of EVOH resin having lower ethylene content is 80 parts and the amount of EVOH resin having higher ethylene content is 20 parts. A metal salt of carboxylic acid shown in Table 1 was also dry-blended to prepare a resin composition.

EVOH resin 1: 29 mol % of ethylene unit content, 99.6 mol % of saponification degree, MFR of 4.0 g/10 min. (210° C., load of 2160 g)

EVOH resin 2: 44 mol % of ethylene unit content, 98.5 mol % of saponification degree, MFR of 4.0 g/10 min. (210° C., load of 2160 g)

EVOH resin 3: 25 mol % of ethylene unit content, 99.7 mol % of saponification degree, MFR of 4.0 g/10 min. (210° C., load of 2160 g)

EVOH resin 4: 51 mol % of ethylene unit content, 94.0 mol % of saponification degree, MFR of 25 g/10 min. (210° C., load of 2160 g)

[Production of a Multilayered Sheet]

The EVOH resin composition thus prepared, polypropylene ("EG47FT" from Japan Polypropylene Corporation), and adhesive resin ("Admer QF551" from Mitsui Chemicals) were fed to a 3-type 5-layer coextrusion T die sheet forming apparatus and coextruded to form a 3-type 5-layer sheet, that is polypropylene layer/adhesive resin layer/EVOH resin composition layer/adhesive resin layer/polypropylene layer, having thicknesses (μm) of 450/25/50/25/450 respectively.

Temperatures of all dies of the sheet forming apparatus were set at 210° C.

[Secondary Molding of the Multilayered Sheet]

The temperatures of the mold and heater of a vacuum-pressure forming machine (plug assist type vacuum-pressure forming machine from ASANO LABORATORIES CO., LTD.) were set at 50° C. and 500° C. respectively. Thus produced 3-type 5-layer sheet is 40 cm long, 40 cm wide and 1000 μm thick, and includes EVOH resin layer with a thickness of 50 μm. The 3-type 5-layer sheet was formed into a cup-shaped container having a bottom wider than the opening. The cup-shaped container has 48 mm in diameter of upper face, 80 mm diameter of bottom face, 52 mm in depth, and draw ratio of the cup, i.e. depth (unit:mm)/maximum diameter (unit:mm), is 0.65.

The molded articles were produced by heating the multilayered sheet at 500° C. (heater temperature) for softening the multilayered film for 24 seconds or 26 seconds respectively.

[Evaluation of Secondary Formability]

The appearance of the cup thus produced as a molded article was observed and visually evaluated with respect to the extent of the generation of streak.

A: no streak or streaks having less than 200 μm in size were slightly observed

B: streaks having a size of 200 to 300 μm were partially observed

C: streaks having a size of 300 to 500 μm were partially observed

D: streaks having a size of 300 to 500 μm were observed throughout the molded article E: streaks occurred and no transparent molded article was obtained

TABLE 1

| No. | | 1 | 2 | 3 | 4 | 5 | 6 | 7 | 8 | 9 | 10 |
|---|---|---|---|---|---|---|---|---|---|---|---|
| Composition (part) | EVOH1 | 80 | 80 | 80 | 80 | 80 | 80 | 80 | 80 | — | — |
| | EVOH2 | 20 | 20 | 20 | 20 | 20 | 20 | 20 | 20 | — | — |
| | EVOH3 | — | — | — | — | — | — | — | — | 80 | 80 |
| | EVOH4 | — | — | — | — | — | — | — | — | 20 | 20 |
| | ΔEt (mol %) | 15 | 15 | 15 | 15 | 15 | 15 | 15 | 15 | 26 | 26 |
| | Carboxylic acid metal salt | St-Zn 200 ppm | — | St-Zn 100 ppm | St-Zn 300 ppm | St-Zn 500 ppm | St-Ca 200 ppm | St-Mg 200 ppm | Mg acetate 200 ppm | — | St-Zn 200 ppm |
| Appearance of container | 24 sec. | A | C | B | A | A | C | C | C | E | D |
| | 26 sec. | B | D | B | A | A | D | D | D | E | D |

EVOH1: ethylene content 29 mol %, saponification degree 99.6 mol %, MFR 4.0 g/10 min.
EVOH2: ethylene content 44 mol %, saponification degree 98.5 mol %, MFR 4.0 g/10 min.
EVOH3: ethylene content 25 mol %, saponification degree 99.7 mol %. MFR 4.0 g/10 min.
EVOH4: ethylene content 51 mol %, saponification degree 94.0 mol %, MFR 25 g/10 min.
ΔEt: difference of ethylene content (mol %)
St-Zn: Zinc stearate
St-Ca: Calcium stearate
St-Mg: Magnesium stearate Multilayered sheets Nos. 2 and 6-9, each of which employs an EVOH resin composition comprising no metal salt of carboxylic acid or a metal salt of carboxylic acid other than zinc stearate, provided a container with streaks. Additionally, in the case of using an EVOH resin composition employing a combination of EVOH resins having a large difference between them, no transparent container was produced.

Multilayered sheet No. 10, which employs an EVOH resin composition comprising zinc stearate and two EVOH resins having ethylene contents significantly different from each other, could not sufficiently reduce the occurrence of streak due to the large difference (ΔEt).

Multilayered sheets Nos. 1 and 3-5, each of which employs an EVOH resin composition comprising zinc stearate and two EVOH resins having ethylene content difference (ΔEt) of 10 to 25 mol %, could reduce the occurrence of streaks or provide a molded article with no streak. It was understood that the inventive EVOH resin composition could reduce occurrence of streaks even when applying to vacuum-pressure forming. However, as shown in the multilayered sheets Nos. 1 and 3, a satisfactory effect of reducing the occurrence would not be obtained in the case of unduly low content of zinc stearate in the EVOH resin composition. Accordingly, the content of zinc stearate is requested to be more than 100 ppm, preferably 250 ppm or more.

INDUSTRIAL APPLICABILITY

The multilayered sheet including a layer of an EVOH resin composition of the invention and a layer of a thermoplastic resin having different stretchability is suitable for producing a container with excellent gas-barrier property and appearance.

What is claimed is:

1. A resin composition comprising
(A) two types of ethylene-vinyl alcohol copolymers and
(B) a zinc salt of higher fatty acid,
wherein difference of content of ethylene unit ($\Delta$Et) between the two types of ethylene-vinyl alcohol copolymers is from 10 to 25 mol %,
wherein each of the (A) ethylene-vinyl alcohol copolymers has an ethylene content of 20 to 60 mol %, and
wherein a content of the (B) zinc salt of higher fatty acid is from 50 to 800 ppm, based on the total content of the (A) two types of ethylene-vinyl alcohol copolymers.

2. The resin composition according to claim 1, wherein the two types of ethylene-vinyl alcohol copolymers are (A1) an ethylene-vinyl alcohol copolymer having an ethylene content of 20 to 40 mol % and (A2) an ethylene-vinyl alcohol copolymer having an ethylene content of 40 to 60 mol %.

3. The resin composition according to claim 2,
wherein a weight ratio of the ethylene-vinyl alcohol copolymer (A1) to the ethylene-vinyl alcohol copolymer (A2) is in the range of 90/10 to 60/40.

4. The resin composition according to claim 1,
wherein a difference of the melt flow rate at 210° C. under load of 2160 g between the two types of ethylene-vinyl alcohol copolymers ($\Delta$MFR) is 5 g / 10 minutes or less.

5. A multilayered sheet or film comprising at least one layer of the resin composition according to claim 1.

6. A multilayered sheet or film according to claim 5, wherein a layer of a thermoplastic resin other than ethylene-vinyl alcohol copolymer is laminated over at least one face of the layer of the resin composition layer through an adhesive resin layer.

7. The multilayered sheet or film according to claim 6, wherein the thermoplastic resin is polypropylene.

8. A method for producing a container excellent in gas-barrier property and appearance comprising
heating and softening the multilayered sheet claimed in claim 5;
forcing the multilayered sheet or film against a mold by suction of air and/or compressed air; and
cooling and releasing the mold to obtain a container.

9. A method for reducing an occurrence of streak, the streak occurred in a secondary molded article from a multilayered sheet or film comprising at least one layer of a resin composition containing two types of ethylene-vinyl alcohol copolymers having an ethylene content different from each other as a gas-barrier layer, comprising
selecting two ethylene-vinyl alcohol copolymers so that difference of ethylene unit content therebetween ($\Delta$Et) is from 10 to 25 mol % and wherein each of the ethylene-vinyl alcohol copolymers has an ethylene content of 20 to 60 mol %; and
blending a zinc salt of higher fatty acid with the two ethylene-vinyl alcohol copolymers at a content of the zinc salt of higher fatty acid ranging from 50 to 800 ppm, based on the total content of the two types of ethylene-vinyl alcohol copolymers.

10. The method according to claim 9, wherein the zinc salt of higher fatty acid is blended with the two ethylene-vinyl alcohol copolymers by dry-blending.

* * * * *